June 20, 1950     A. T. SCOTT     2,512,388
BREAD TOASTER
Filed Jan. 28, 1949     2 Sheets-Sheet 1
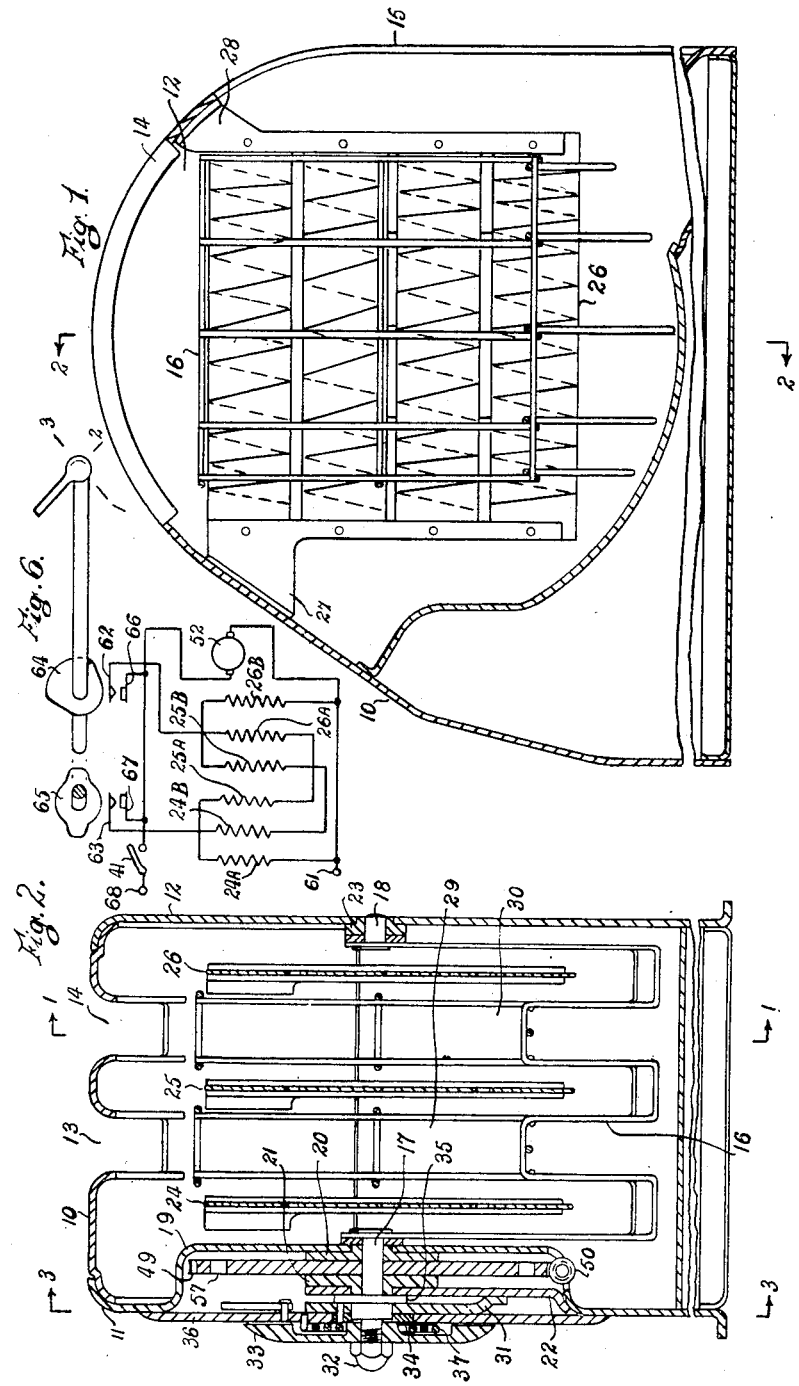
Inventor
ALAN THURBURN SCOTT
By Richard Goff
Agent June 20, 1950  A. T. SCOTT  2,512,388
BREAD TOASTER
Filed Jan. 28, 1949  2 Sheets-Sheet 2
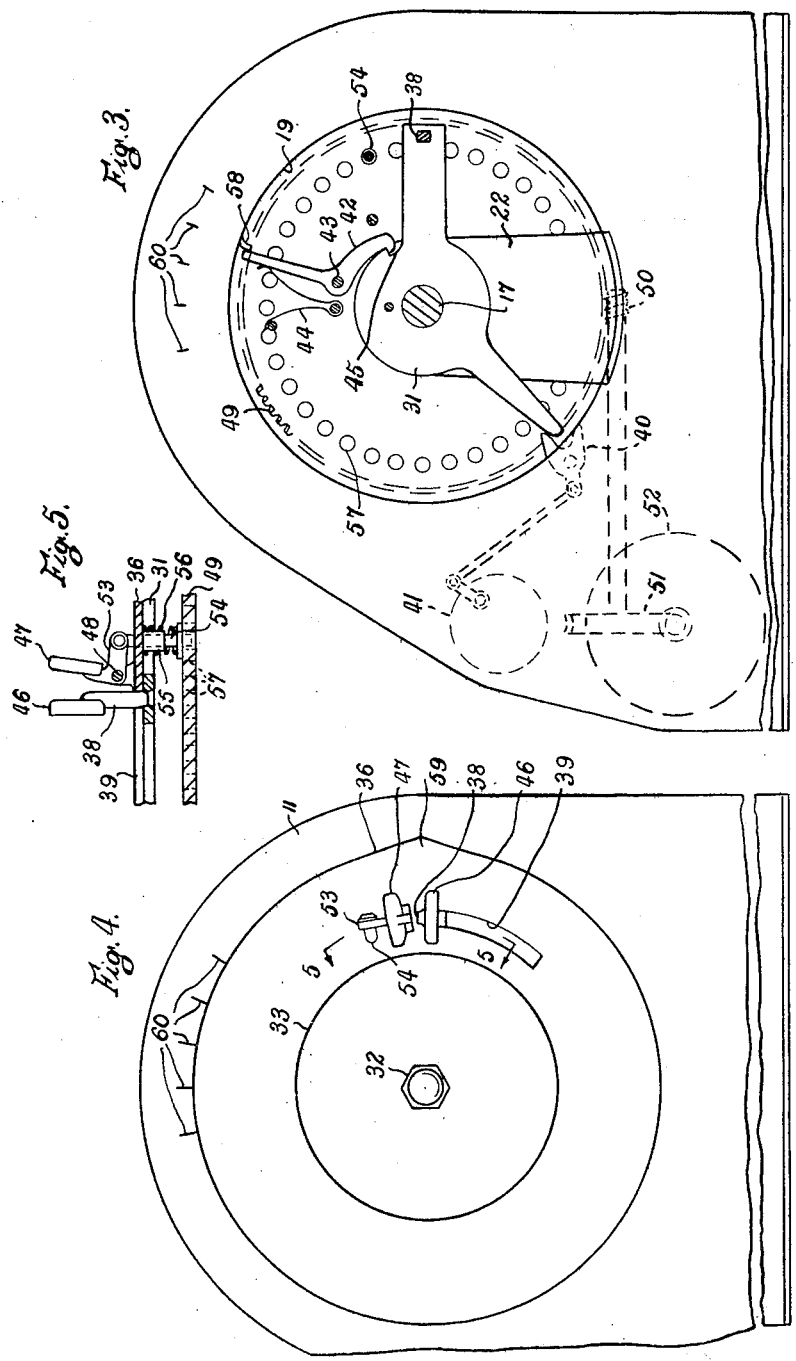
Inventor
ALAN THURBURN SCOTT
By Richard [...]
Agent

Patented June 20, 1950

2,512,388

UNITED STATES PATENT OFFICE 2,512,388

BREAD TOASTER

Alan Thurburn Scott, Berkhamsted, England

Application January 28, 1949, Serial No. 73,389
In Great Britain January 30, 1947

5 Claims. (Cl. 99—327)

1

This invention relates to electrically-heated bread toasters of the kind incorporating a timing device which, after a slice of bread has been toasted for a predetermined time, automatically displaces the bread and thereby draws attention to the fact that the toasting operation is completed.

An object of this invention is to provide such a toaster having means for ejecting the bread when toasted.

Another object is to secure more uniformity of toasting over the surface of a slice than hitherto.

A further object is to enable the bread to be toasted quickly or slowly according to taste.

Another object is to enable the toasting period to be easily varied at will of the operator.

Further objects and advantages of the invention will be apparent from the following description of an embodiment thereof, as applied to apparatus adapted to toast two slices at the same time, which is given with reference to the accompanying diagrammatic drawings. In these drawings—

Figure 1 is a side elevation of the toaster, sectioned on the line 1—1 in Figure 2, Figure 2 is a section on the line 2—2 in Figure 1, Figure 3 is a section on the line 3—3 in Figure 2, Figure 4 is a side elevation of the toaster as viewed from the left-hand side of Figure 2, Figure 5 is a section of a detail, developed on the line 5—5 in Figure 4, and Figure 6 is a circuit diagram.

The toaster includes a sheet-metal casing having a shell 10 and side members 11 and 12. In the top of the casing shell 10 are two slots 13 and 14 for the insertion of slices of bread, and in the front end is an aperture 15 for ejection of the toast.

The cage 16, which is of welded wire construction, is provided with a pair of trunnion pins 17 and 18. The casing side 11 has a circular depression 19 co-axial with the cage, and the trunnion pin 17 is rotatable in the bearing 20 fixed at the centre of this depression and in a bearing 21 fixed to a bracket 22 mounted in the depression 19. The trunnion pin 18 is rotatable in a bearing 23 fixed to the casing side 12. The top and the front end of the cage are open. Three flat heating elements 24, 25 and 26, of the usual construction consisting of resistance strip wound on mica sheets, are disposed vertically in the cage and parallel to the casing sides, being carried by supports, such as 27 and 28 in Figure 1, fixed to the

2 casing shell 10. The cage is provided with two rectangular compartments 29 and 30 placed respectively between each adjacent two heating elements, and adapted to hold slices of bread.

A bell-crank lever 31 is held fast on the trunnion pin 17 by means of a nut 32 which acts through washers 33 and 34 to clamp the lever 31 against a flange 35 integral with the pin 17. A disk 36, forming the above-mentioned intermediate driving member, is rotatable on the washer 34 and its border overlies the rim of the depression 19. A spiral wire torsion spring 37 housed in the washer 33 has its ends engaged respectively in holes in the lever 31 and the disk 36 and forms a resilient coupling urging the lever forwards relatively to the disk so as to bring a peg 38 on one arm of the lever into engagement with the leading end of an arcuate slot 39 in the disk. The other arm of the lever 31 cooperates with a V lever 40 controlling a snap-action switch 41. A detent 42 is movably mounted on a pin 43 fixed in the disk 36 and is adapted to engage, under the influence of a spring 44, a notch 45 in the lever 31 and hold the latter against the torque exerted by the spring 37 in such a position that the peg 38 is at the end of the slot 39 which is occupied in Figure 4.

A lug 46 fixed to the peg 38 projects laterally beyond the outer face of the disk 36. A lug 47 is pivoted at 48 to the disk for rocking about a radial axis and also projects angularly behind the lug 46. Drawing the lugs 46 and 47 together with a finger and thumb rotates the lever 31 relatively to the disk 36 far enough to allow the detent 42 to engage the notch 45.

A worm wheel 49 is rotatable on the cage trunnion pin 17 and is in mesh with a worm 50 driven through reduction gearing 51 by a synchronous self-starting electric motor 52 housed in the casing. The snap-action switch 41 controls the supply of current to both the motor 52 and the heater elements 24, 25 and 26.

The rocking lug 47 has a lever 53 pivotally connected to a bolt 54 lying parallel to the cage axis and slidable in a guide 55 on the disk 36. A helical spring 56 compressed between the disk 36 and a flange on the bolt 54 serves to engage the bolt in any of a ring of closely pitched holes 57 in the worm wheel 49. The bolt and holes thus form a positive clutch biased towards its engaged position by the spring 56 and adapted to be disengaged by the lug 47.

A fixed stop 58 (Figure 3) projects into the depression 19 in the path of a tail arm of the detent lever 42. A pointer 59 on the disk 36 cooperates with a number of markings 60 on the casing side 11 indicating different toasting times.

The apparatus operates as follows. It will be assumed that the cage 16 is in the finishing position, i. e. displaced clockwise from the position in which it appears in Figure 1, with its bottom sloping downwards towards the discharge aperture 15, and that the switch 41 is off.

First the two lugs 46 and 47 are drawn together. Finger pressure on the pivoted lug 47 tilts it so that the bolt 54 is disengaged from the worm wheel 49, but the disk 36 is prevented from rotating forwards because the detent lever 42 is engaged by the stop 58. The bell-crank lever 31 therefore rotated backwards until the detent lever registers with the notch 45. The two lugs are now moved together backwards and stopped at a position indicated by the pointer 59 and the markings 60. The switch-actuating arm of the bell-crank lever 31 accordingly closes the switch 41 so that the motor 52 starts and the heating elements are energised. The lugs 46 and 47 are now released, and the bolt 54 drops into the nearest hole 57 on the worm wheel 49 which is rotated slowly forwards by the motor and which begins to drive the cage. Two slices of bread are now dropped into the pockets 29 and 30 of the cage through the slots 13 and 14, and, since the slices are rotated slowly relatively to the heating elements, the toasting is substantially uniform over their surfaces.

As the cage approaches its finishing position, the detent lever 42 engages the fixed stop 58 and disengages the detent so that the tension spring 37 unwinds and suddenly rotates the cage forwards to a position such that the peg 38 engages the end of the slot 39 opposite to that which it occupies in Figure 4. As a result, the toast is tipped out of the cage and through the aperture 15 in the casing, and the switch is opened by the bell-crank lever 31.

Each of the heating elements may have two separate resistance strips each distributed over it; and additional switching means may be provided whereby one or both strips may be energised at will to provide slow or fast toasting. If the two strips are of different ratings and either can be energised alone, as well as both together, three rates of toasting can be provided. Switching means providing for three toasting rates are shown in Figure 6. The three higher-power strips 24A, 25A and 26A are connected in series between a mains terminal 61 and a contact blade 62. The three lower-power strips 24B, 25B and 26B are connected in series between the terminal 61 and a contact blade 63. The blades 62 and 63 can be caused by insulating cams 64 and 65 to contact blades 66 and 67 which are connected through the snap-action switch 41 to a mains terminal 68. The cams 64 and 65 are actuated by a common control member 69 movable to any of the three positions indicated to give the three different degrees of heating. Crisp toast is obtained by using a low heat and setting the pointer 59 to give a long run of the cake. Increasing the heat and shortening the run of the cage makes the toast spongy.

I claim:

1. An electrically heated bread toaster including two fixed heating elements spaced apart in parallel vertical planes, a cage comprising a flat pocket for holding a slice of bread disposed between said heating elements, fixed bearing means supporting said cage for angular displacement about an axis perpendicular to said planes and passing through said heating elements, a motor adapted to run at a substantially constant speed, a transmission between said motor and said cage and including disengageable coupling means, and manual control means operatively connected with said cage and said coupling means for first setting said cage about said axis to any one of various angular starting positions in which the mouth of said pocket is directed at least in part upwards for receiving a slice of bread, and thereafter operating said coupling means to cause the cage to be rotated by said motor from the selected starting position through a part of a revolution into a finishing position in which said mouth is directed sufficiently downwards for the toasted slice of bread to fall out of the cage.

2. A bread toaster as claimed in claim 1, wherein said transmission includes a resilient coupling having driving and driven elements and detent mechanism in parallel with said resilient coupling, and operating when the cage is in any of said starting positions to hold said resilient coupling strained in a condition such that its driven element lags behind its driving element, and a fixed abutment so placed as to engage and thereby release said detent mechanism as the cage enters the finishing position.

3. A bread toaster as claimed in claim 1, wherein said transmission includes a member driven by said motor and co-axial with said cage, an intermediate driving member co-axial with the cage, a resilient coupling between the intermediate driving member and the cage, and a controllable clutch for connecting said motor-driven member to said intermediate driving member, the toaster also including means for straining said coupling when the cage is set to a starting position, detent means adapted to hold said coupling in its strained position, and an abutment so placed as to engage and thereby release the detent as the cage enters the finishing position, so as to impart a sudden angular displacement to the cage in a direction such as to ensure that the toast is tipped out.

4. A bread toaster as claimed in claim 1, wherein said transmission includes a motor-driven member co-axial with the cage, an intermediate driving member co-axial with the cage, a resilient coupling between the intermediate driving member and the cage, and a controllable clutch for connecting said motor-driven member to said intermediate driving member, the toaster also including means urging said clutch towards its engaged condition, a first lug on said intermediate driving member and displaceable relatively to said member for disengaging said clutch, a second lug rigid with said cage, said lugs being capable of being moved towards each other by pressure applied by a finger and thumb of the operator's hand to strain said resilient coupling and thereafter of being angularly displaced about the axis of rotation of the cage in order to set the cage to a starting position, detent means for holding said coupling in its strained position, and an abutment so placed as to engage and thereby release said detent means as the cage enters the finishing position so as to impart a sudden angular displacement to the cage in a direction such as to ensure that the toast is tipped out.

5. An electrically heated bread toaster including a casing, three heating elements spaced apart in parallel planes within said casing, supports fixing said heating elements to said casing, two bearings respectively in the sides of said casing and having a common axis perpendicular to said planes and passing through said heating elements, a cage having two trunnion pins mounted respectively in said bearings, a transverse portion carried by said pins and cranked to clear said heating elements, and two flat pockets carried by said transverse portion and projecting respectively into the spaces between said heating elements, said cage being anguluarly displaceable from a starting position in which said pockets open at least in part upwards to a finishing position in which said pockets open at least in part downwards, and a motor drivably connected with said cage for imparting such angular displacement thereto.

ALAN THURBURN SCOTT.

REFERENCES CITED

The following references are of record in the file of this patent:

UNITED STATES PATENTS

| Number | Name | Date |
| --- | --- | --- |
| 1,361,183 | Reed | Dec. 7, 1920 |
| 1,471,275 | Moneuse | Oct. 16, 1923 |
| 1,682,683 | Parodi | Aug. 28, 1928 |
| 1,769,893 | Uhl | July 1, 1930 |
| 2,047,046 | Wade | July 7, 1936 |
| 2,456,291 | Malone | Dec. 14, 1948 |